US009597807B2

United States Patent
Wu et al.

(10) Patent No.: US 9,597,807 B2
(45) Date of Patent: Mar. 21, 2017

(54) ROBOT TEACHING DEVICE

(71) Applicant: HIWIN TECHNOLOGIES CORP., Taichung (TW)

(72) Inventors: Wen-Chia Wu, Taichung (TW); Yan-Yu Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 14/523,192

(22) Filed: Oct. 24, 2014

(65) Prior Publication Data

US 2016/0114478 A1    Apr. 28, 2016

(51) Int. Cl.
| | |
|---|---|
| *B25J 9/18* | (2006.01) |
| *G05B 19/19* | (2006.01) |
| *B25J 13/06* | (2006.01) |
| *B25J 13/00* | (2006.01) |

(52) U.S. Cl.
CPC ............ *B25J 13/06* (2013.01); *B25J 13/006* (2013.01); *Y10S 901/03* (2013.01)

(58) Field of Classification Search
CPC .... Y10S 901/01; Y10S 901/46; Y10S 901/02; H04W 4/02; B25J 11/008; B25J 13/06; B25J 11/0095; B25J 5/00; B25J 9/162; B25J 13/006; B25J 9/1615; B25J 11/00; G05B 2219/40298; G05B 2219/39001; G05B 2219/39384; G05B 2219/50198
See application file for complete search history.

(56) References Cited

U.S. PATENT DOCUMENTS

| | | | | |
|---|---|---|---|---|
| 8,918,213 | B2 * | 12/2014 | Rosenstein | B25J 5/007 700/245 |
| 2010/0145520 | A1 * | 6/2010 | Gerio | B25J 13/06 700/264 |
| 2011/0160910 | A1 * | 6/2011 | Preisinger | B25J 13/06 700/275 |
| 2011/0288684 | A1 * | 11/2011 | Farlow | B25J 11/009 700/264 |
| 2012/0173018 | A1 * | 7/2012 | Allen | B25J 13/06 700/245 |
| 2012/0182392 | A1 * | 7/2012 | Kearns | B25J 11/009 348/46 |
| 2013/0226344 | A1 * | 8/2013 | Wong | G05D 1/024 700/258 |

(Continued)

*Primary Examiner* — Marlon Fletcher
(74) *Attorney, Agent, or Firm* — Wang Law Firm, Inc.

(57) ABSTRACT

A robot teaching device is suitable for being signal connected to a controller used to control a robot, and includes: a connecting base which includes an enable switch and a first connector, and is connected to the controller by a transmission wire; a motion device which is removably disposed in the connecting base, and includes a second connector connected to the first connector, and a touch screen for displaying plural virtual keys. The motion device will be wirelessly signal connected to the controller, when it is removed from the connecting base, and the touch screen will display the virtual keys. When the motion device is inserted in the connecting base, and the enable switch is not pressed, the first and second connectors will be connected, and the virtual keys will be switched off. The virtual keys will be switched on after the enable switch is kept being pressed.

10 Claims, 14 Drawing Sheets

(56) References Cited

U.S. PATENT DOCUMENTS

| | | | |
|---|---|---|---|
| 2015/0066209 A1* | 3/2015 | Som | B25J 13/06 700/264 |
| 2015/0174767 A1* | 6/2015 | Som | B25J 13/06 700/257 |
| 2015/0190927 A1* | 7/2015 | Sutherland | B25J 9/1689 700/259 |
| 2015/0332213 A1* | 11/2015 | Galluzzo | G06Q 10/087 700/216 |
| 2016/0297067 A1* | 10/2016 | Kogan | B25J 13/06 |

* cited by examiner

ROBOT TEACHING DEVICE

BACKGROUND OF THE INVENTION

Field of the Invention

The present invention relates to a robot, and more particularly to a robot teaching device.

Description of the Prior Art

When a robot performs tasks repeatedly along a fixed trajectory, a teaching device must be used to write a program to make the robot do the motion of stretching, bending, moving up and down or left and right, rotating, or the combination of the afore motions, while moving along the fixed trajectory.

Figure 1:
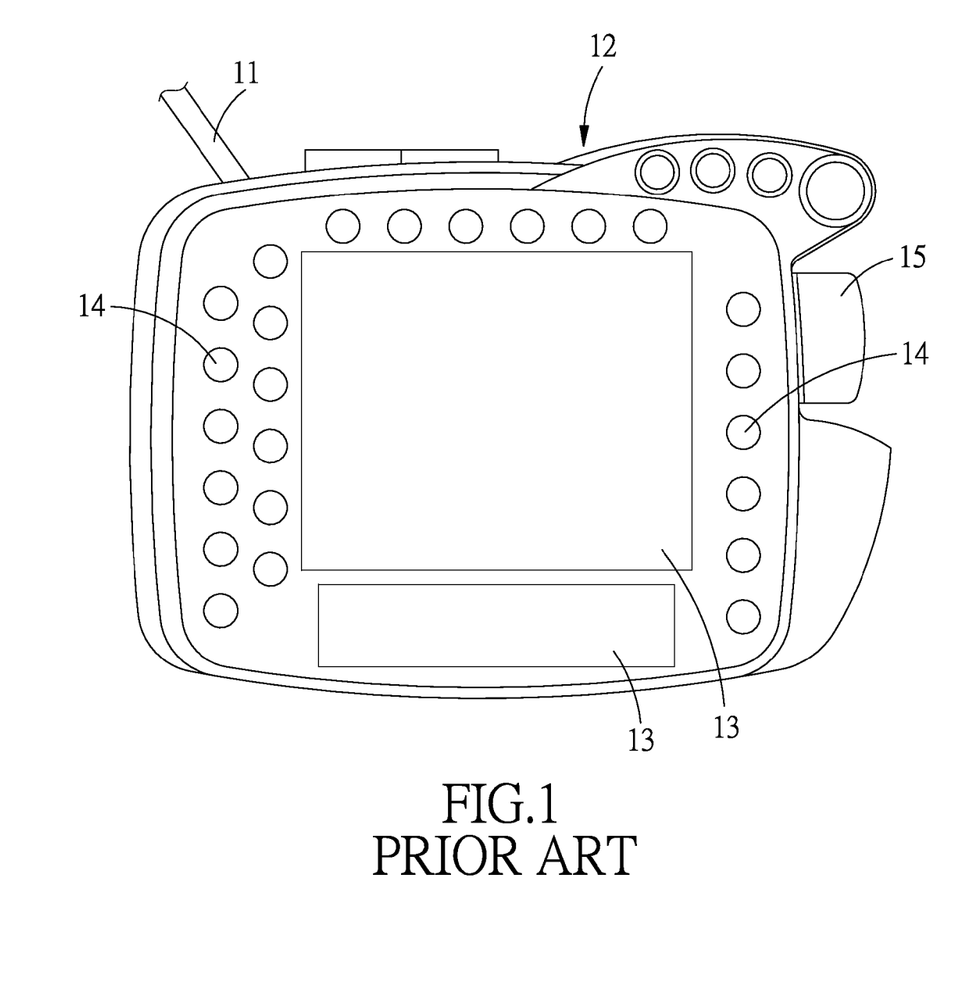
FIG. 1 shows a conventional robot teaching device.
Figure 2:
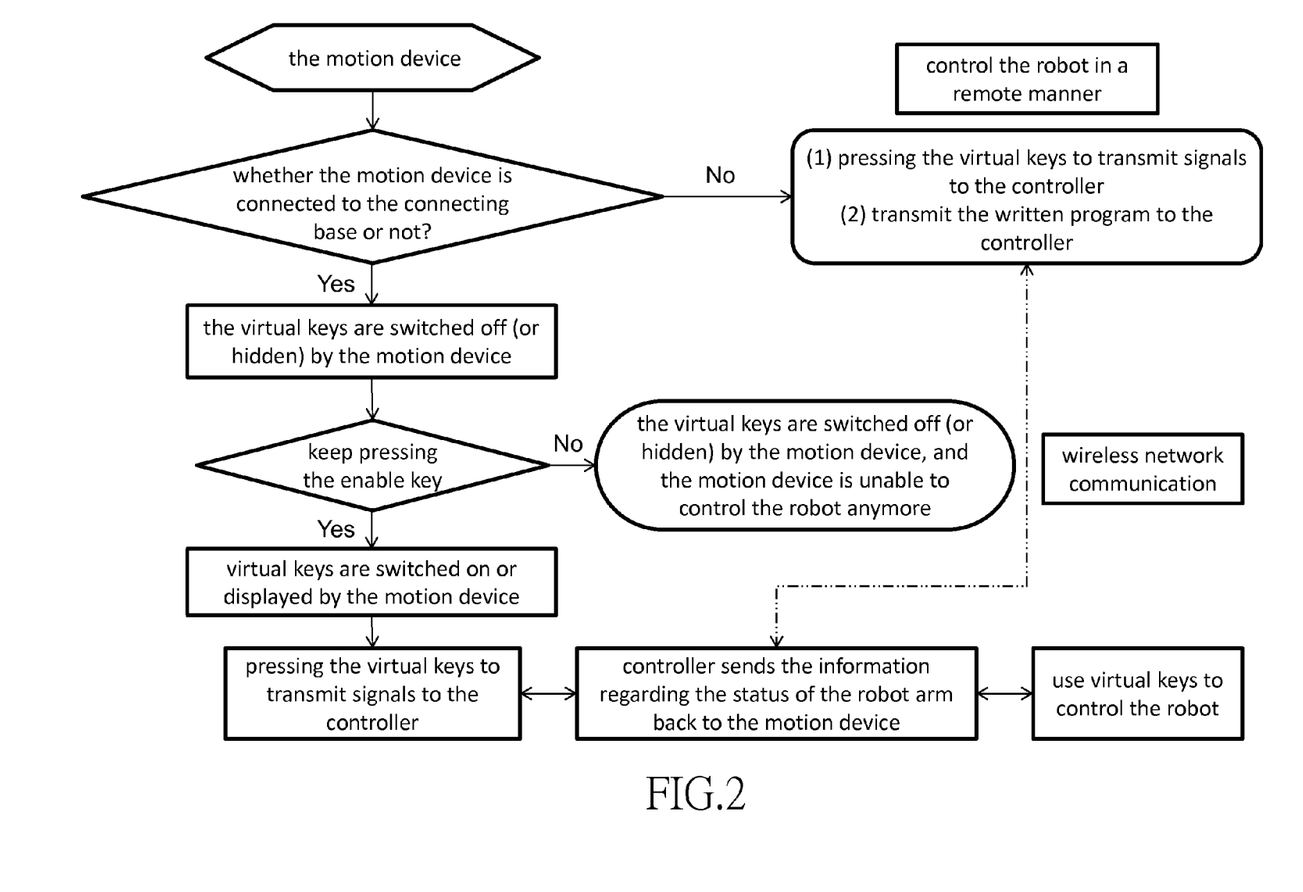
FIG. 2 is a flow chart of a robot teaching device in accordance with a first embodiment of the present invention.
Figure 3:
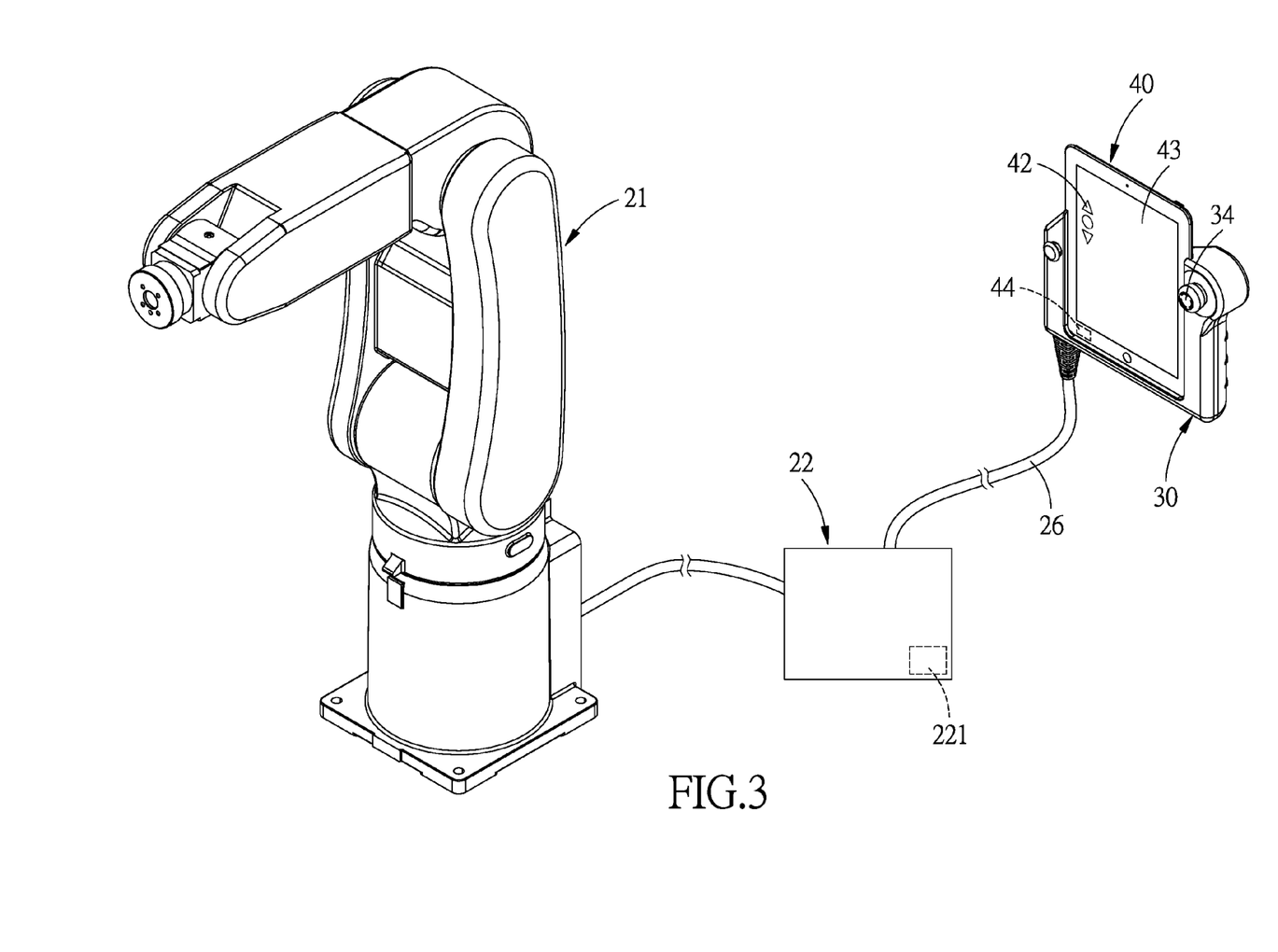
FIG. 3 is a perspective view of the robot teaching device in accordance with the first embodiment of the present invention.
Figure 4:
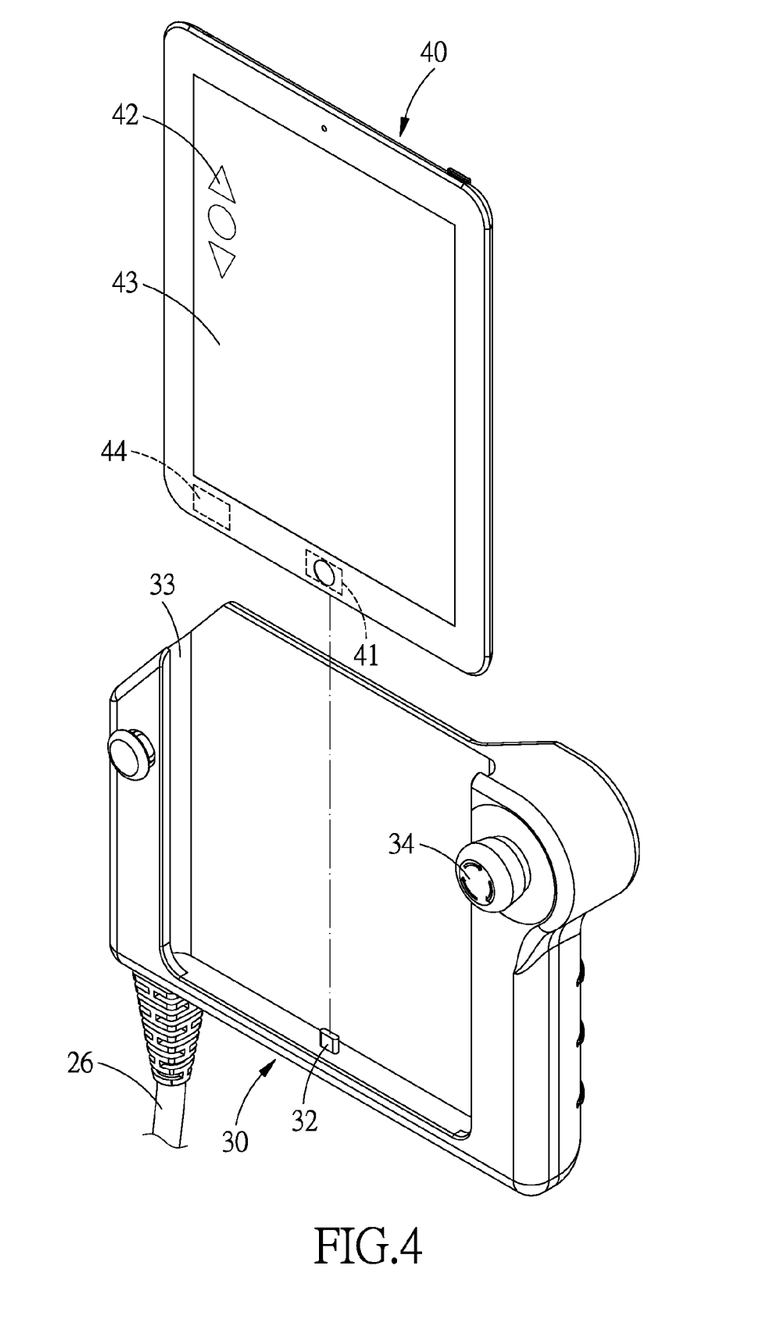
FIG. 4 is an exploded view of the robot teaching device in accordance with the first embodiment of the present invention.
Figure 5:
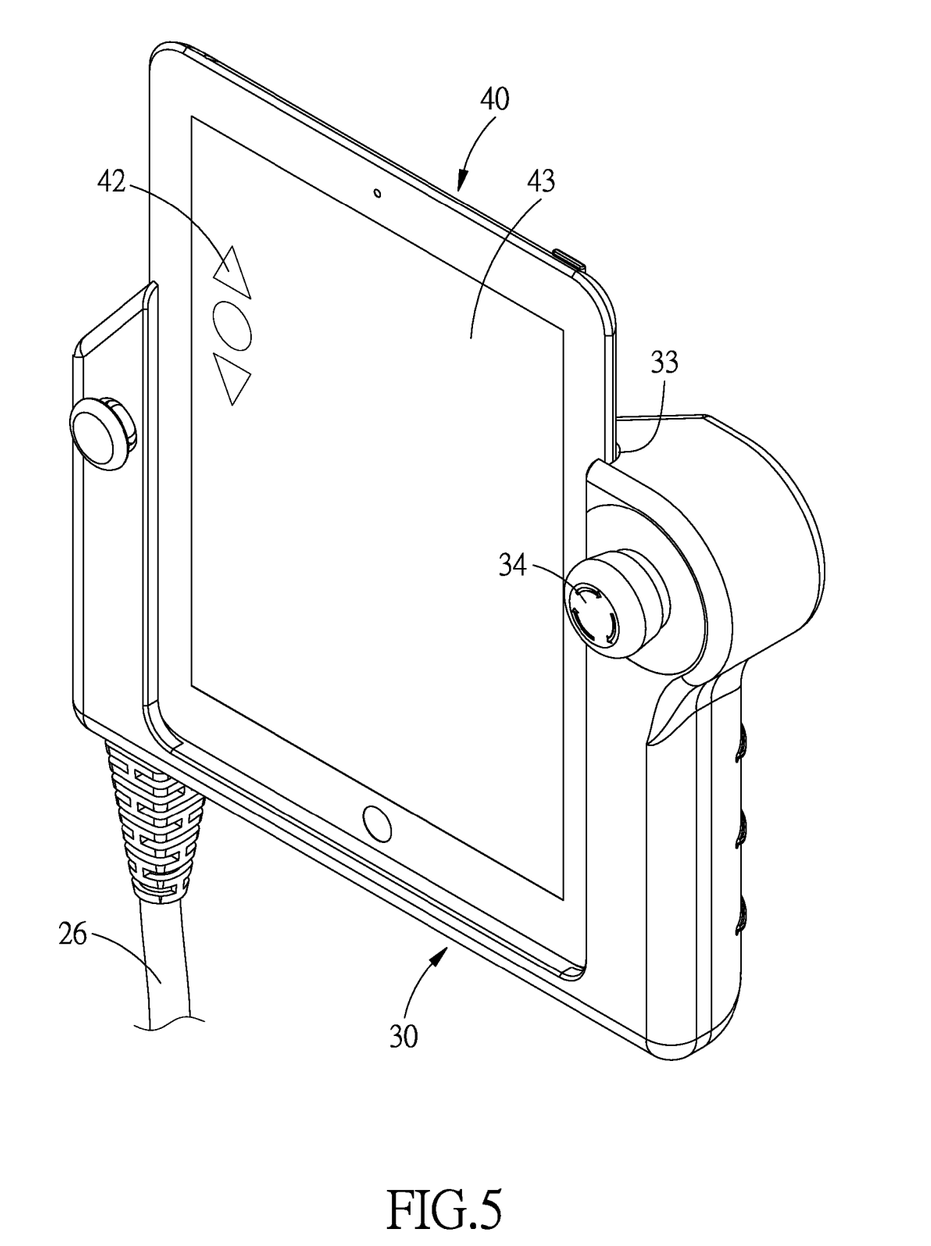
FIG. 5 is an assembly view of the robot teaching device in accordance with the first embodiment of the present invention.

As shown in FIG. 1, a conventional robot teaching device is signal connected to a robot via a transmission wire 11, and includes a base 12, a display screen 13 mounted on the base 12, a plurality of input keys 14 which is disposed on the base 12 and capable of displaying results on the display screen 13, and an emergency switch 15. The input keys 14 are used to write programs to make the robot to move repeatedly along a fixed trajectory. With the input keys 14, some teaching operations, such the setting, changing or confirming of the motion program, positions and speed of the robot, can be performed. The emergency switch 15 can prevent the risk of the robot colliding with the user, when the user is unfamiliar with the teaching device. However, in actual application, this robot teaching device still suffers from the following defects.

First of all, impediment to the user's motion.

Since the robot teaching device has to be signal-connected to the robot via the transmission wire 11, the user's motion is restricted by the length of the transmission wire 11 when writing programs.

Second, the robot teaching device is not easy to operate.

Since the robot teaching device must be equipped with the input keys 14 and the display screen 13, which will increase the size and weight of the display, making it impossible to watch and hold the display screen for a long time. Hence, the convenience of using the teaching device is adversely affected, and further increases the difficulties in writing programs.

The present invention has arisen to mitigate and/or obviate the afore-described disadvantages.

SUMMARY OF THE INVENTION

The primary objective of the present invention is to provide a robot teaching device with improved convenience of use.

To achieve the above objective, a robot teaching device in accordance with the present invention is suitable for being signal connected to a controller which is used to control motion of a robot, the robot teaching device comprises:

a connecting base includes an enable switch and a first connector, and is signal connected to the controller by a transmission wire;

a motion device is removably disposed in the inserting groove of the connecting base, and includes a second connector which is signal connected to the first connector, and a touch screen capable of displaying a plurality of virtual keys. The motion device is signal connected to the controller in a wireless transmission manner, when it is removed from the connecting base, and the touch screen displays the virtual keys. When the motion device is inserted in the connecting base, and the enable switch is not pressed, the second connector will be connected to the first connector, and the virtual keys will be switched off. The virtual keys will continually be switched on after the enable switch is kept being pressed.

To achieve the above objective, a robot teaching device in accordance with the present invention is suitable for being signal connected to a controller which is used to control motion of a robot, the robot teaching device comprises:

a connecting base includes a plurality of physical keys, an enable switch and a first connector, and is signal connected to the controller by a transmission wire;

a motion device is removably disposed in the inserting groove of the connecting base, and includes a second connector which is signal connected to the first connector, and a touch screen capable of displaying a plurality of virtual keys. The motion device is signal connected to the controller in a wireless transmission manner, when it is removed from the connecting base, the touch screen displays the virtual keys, and the physical keys are deactivated, when the motion device is inserted in the connecting base, and the enable switch is not pressed, the second connector is connected to the first connector, and the virtual keys are switched off, and the physical keys are deactivated, and the physical keys are activated after the enable switch is kept being pressed.

To achieve the above objective, a robot teaching device in accordance with the present invention is suitable for being signal connected to a controller which is used to control motion of a robot, the robot teaching device comprises:

a connecting base includes a plurality of physical keys, an enable switch and a first connector, and is signal connected to the controller by a transmission wire;

a motion device is removably disposed in the connecting base, and includes a second connector which is signal connected to the first connector, and a touch screen capable of displaying a plurality of virtual keys. The motion device will be signal connected to the controller in a wireless transmission manner, when it is removed from the connecting base, meanwhile, the touch screen displays the virtual keys, and the physical keys are deactivated, the physical keys are allowed to be activated by keeping pressing the enable switch, when the motion device is inserted in the connecting base, and the enable switch is not pressed, the second connector will be connected to the first connector, meanwhile, the virtual keys are switched off, and the physical keys are deactivated, the physical keys are activated by keeping pressing the enable switch.

Preferably, the controller includes a first wireless receiving and transmitting unit, and the motion device includes a second first wireless receiving and transmitting unit which is connected to the first wireless receiving and transmitting unit in a wireless transmission manner.

Preferably, the connecting base includes an inserting groove for insertion of the motion device.

Preferably, the connecting base includes an emergency switch, when the motion device is inserted in the connecting base, and the second connector is connected to the first connector, the emergency switch is controlled by the controller to stop the robot.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 2-7, a robot teaching device in accordance with a first embodiment of the present invention is suitable for being signal connected to a controller 22 which is used to control the motion of a robot 21. In this embodiment, the controller 22 includes a first wireless receiving and transmitting unit 221 capable of performing wireless signal reception and transmission. The robot teaching device essentially comprises a connecting base 30 and a motion device 40.

The connecting base 30 includes an enable switch 31 and a first connector 32 and is signal connected to the controller 22 by a transmission wire 26. In this embodiment, the connecting base 30 includes an inserting groove 33 for insertion of the motion device 40, and an emergency switch 34 which is controlled by the controller 22 to stop the robot 21, and disposed at each of left and right sides thereof for enabling the user to operate with left or right hand.

The motion device 40 is removably disposed in the inserting groove 33 of the connecting base 30, and includes a second connector 41 which is signal connected to the first connector 32, and a touch screen 43 capable of displaying a plurality of virtual keys 42. The motion device 40 will be signal connected to the controller 22 in a wireless transmission manner (such as wireless network communication), when it is removed from the connecting base 30, and the touch screen 43 will display the virtual keys 42. When the motion device 40 is inserted in the connecting base 30, and the enable switch 31 is not pressed, the second connector 41 will be connected to the first connector 32, and the virtual keys 42 will be switched off or deactivated. The virtual keys 42 will be continually switched on or displayed (or activated) after the enable switch 31 is kept being pressed.

In this embodiment, the motion device 40 is a tablet PC or smart phone. The motion device 40 includes a second wireless receiving and transmitting unit 44 which is connected to the first wireless receiving and transmitting unit 221 in a wireless transmission manner, so that, the motion device 40 can be signal connected to the controller 22 in a wireless transmission manner, when it is removed from the connecting base 30. Namely, the program written by the motion device 40 and the control signals generated by pressing the virtual keys 42 can be wirelessly transmitted to the controller 22, so as to control or teach the robot to perform tasks. Similarly, the controller 22 is able to transmit the information regarding the motion of the robot 21 back to the motion device 40 in a wireless manner.

The meaning of the sentences "when the motion device 40 is inserted in the connecting base 30, and the enable switch 31 is not pressed, the virtual keys 42 will be switched off (or hidden)" is that pressing the virtual keys 42 or corresponding positions on the touch screen 43 would not generate any control signals, so that the motion device 40 is unable to control the motion of the robot 21, or to write program.

When the motion device 40 is inserted in the connecting base 30, and the enable switch 31 is kept being pressed, the virtual keys 42 will be continually displayed on the touch screen 43, so that the motion device 40 is able to control the motion of the robot 21, or to write program for the robot.

What mentioned above are the structures of the embodiment of the present invention, for a better understanding of the robot teaching device in accordance with the present invention, its operating advantages and the specific objects attained by its uses, reference should be had to the following descriptive matter.

Figure 7:
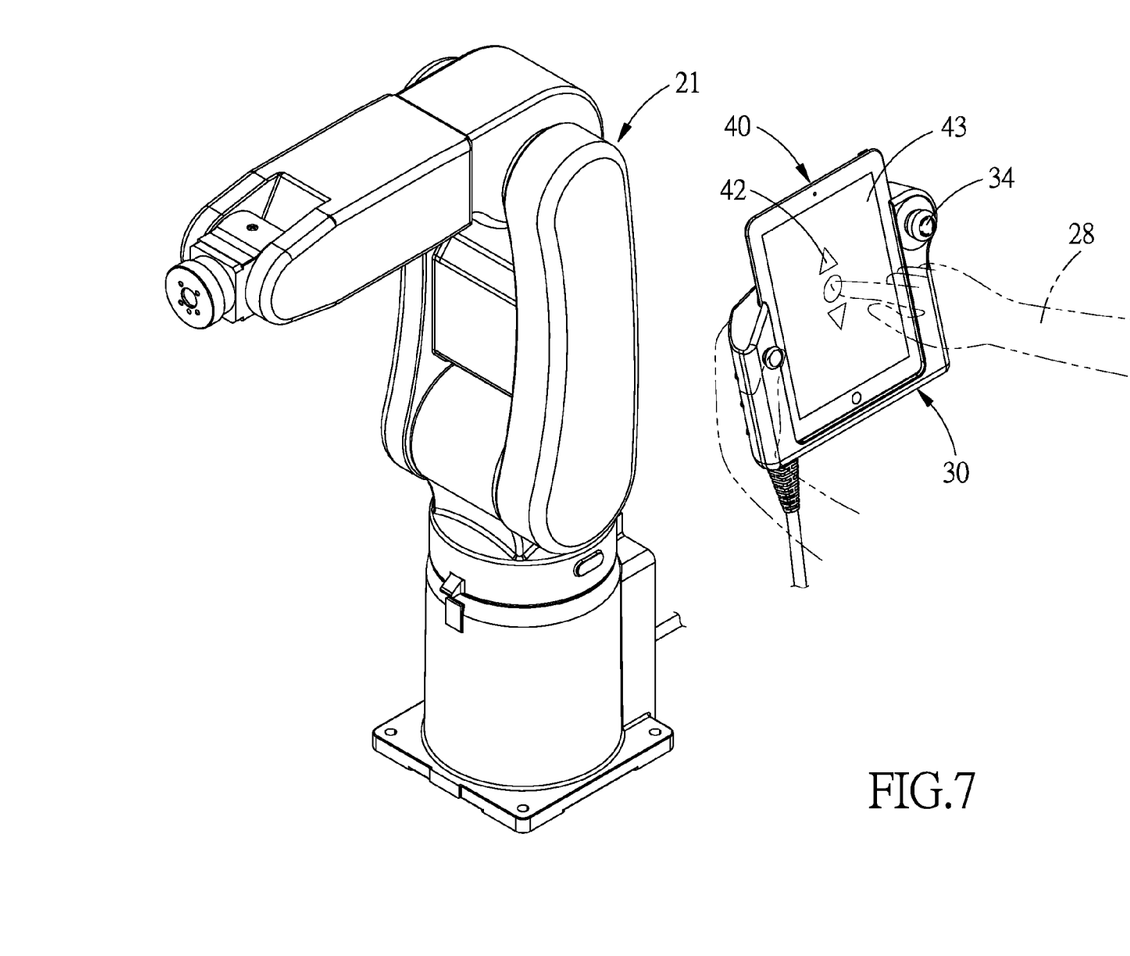
FIG. 7 is an operational view of the robot teaching device in accordance with the first embodiment of the present invention.
Figure 8:
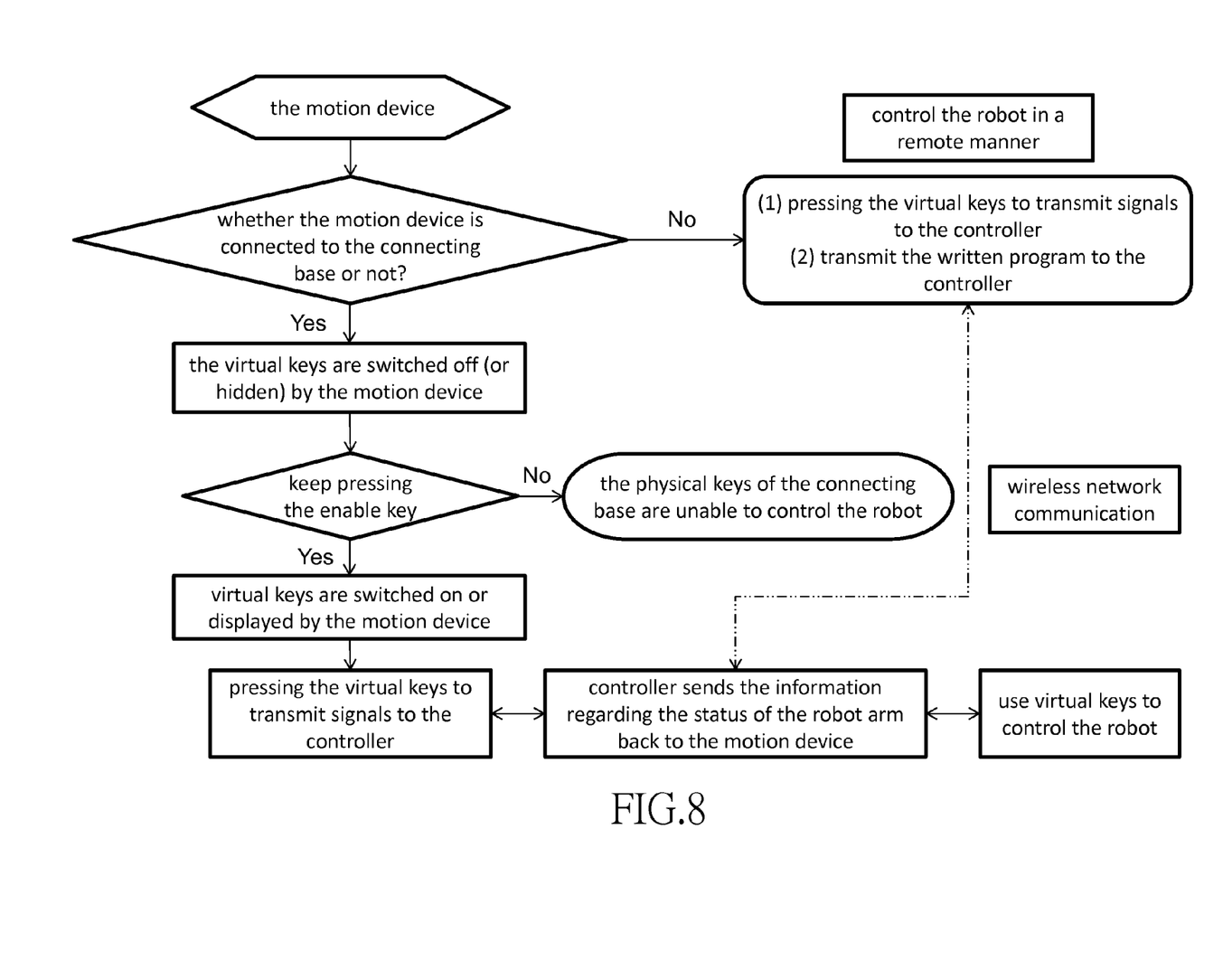
FIG. 8 is a flow chart of a robot teaching device in accordance with a second embodiment of the present invention.

First of all, the motion device 40 can be removed from the connecting base 30, and when it is removed from the connecting base 30, the motion device 40 can be signal connected to the controller 22 in a wireless signal transmission manner. Therefore, the user 28 can take the motion device 40 away from the spot where the robot is placed and then write program remotely, without being restricted by the length of the transmission wire 26 connected to the connecting base 30. Hence, the convenience of use is further improved.

On the other hand, also due to the fact that the motion device 40 can be removed from the connecting base 30, and when it is removed from the connecting base 30, the motion device 40 can be signal connected to the controller 22 in a wireless signal transmission manner. When writing programs, or teaching or controlling the motion of the robot, the user simply needs to hold the motion device 40 only, without having to hold both the connecting base 30 and the motion device 40. Therefore, the weight the user has to carry or hold is much reduced, and the touch screen 43 of the motion device 40 is relatively big, which also increases the time duration that the user can watch and hold the motion device 40, and the convenience of use is further improved.

It is to be noted that, when the motion device 40 is inserted in the connecting base 30, the enable switch 31 must be pressed, so that the touch screen 43 can display the virtual keys 42, and program writing, or robot teaching and controlling can be carried out. Once the enable switch 31 is released, the virtual keys 42 displayed on the touch screen 43 will be deactivated, so as to prevent the risk of the robot 21 colliding with the user, when the user is unfamiliar with the teaching device.

Referring to FIGS. 8-12, a robot teaching device in accordance with a second embodiment of the present invention is also suitable for being signal connected to a controller 22 which is used to control the motion of a robot 21. In this embodiment, the controller 22 includes a first wireless receiving and transmitting unit 221 capable of performing wireless signal reception and transmission. The robot teaching device essentially comprises a connecting base 30 and a motion device 40.

Figure 6:
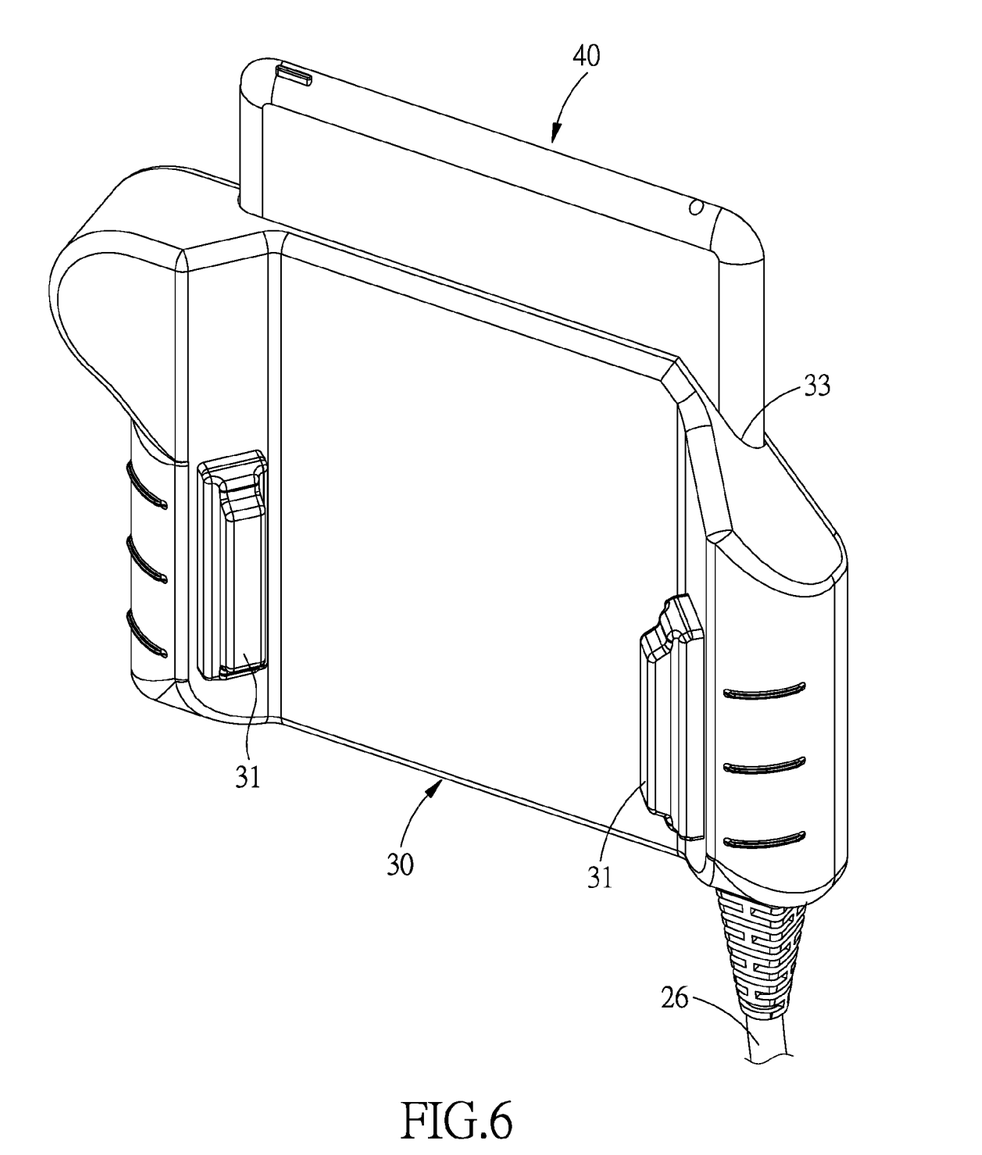
FIG. 6 is another perspective view of the robot teaching device in accordance with the first embodiment of the present invention.

The connecting base 30 includes a plurality of physical keys 35, an enable switch 31 (as shown in FIG. 6) and a first connector 32 and is signal connected to the controller 22 by a transmission wire 26. In this embodiment, the connecting base 30 includes an inserting groove 33 for insertion of the motion device 40, and an emergency switch 34 which is controlled by the controller 22 to stop the robot 21.

The motion device 40 is removably disposed in the connecting base 30, and includes a second connector 41 which is signal connected to the first connector 32, and a touch screen 43 capable of displaying a plurality of virtual keys 42. The motion device 40 will be signal connected to the controller 22 in a wireless transmission manner (such as wireless network communication), when it is removed from the connecting base 30, meanwhile, the touch screen 43 will display the virtual keys 42, and the physical keys 35 will be deactivated. When the motion device 40 is inserted in the connecting base 30, and the enable switch 31 is not pressed, the second connector 41 will be connected to the first connector 32, meanwhile, the virtual keys 42 will be switched off, and the physical keys 35 are deactivated. The virtual keys 42 will be continually switched on or displayed, and the physical keys 35 are activated, after the enable switch 31 is kept being pressed. In this embodiment, the motion device 40 is a tablet PC or smart phone. The motion device 40 includes a second wireless receiving and transmitting unit 44 which is connected to the first wireless receiving and transmitting unit 221 in a wireless transmission manner.

The second embodiment is similar to the first embodiment, except that: when the user needs safety protection, he/she can insert the motion device 40 in the connecting base 30, and make the second connector 41 signal connected to the first connector 32. At this moment, the virtual keys 42 displayed on the touch screen 43 of the motion device 40 will be deactivated or will disappear, and no program writing, robot controlling or teaching is allowed. The user 28 has to keep pressing the enable switch 31 and the physical keys 35 on the connecting base 30, in order to control and teach the motion of the robot 21.

Figure 9:
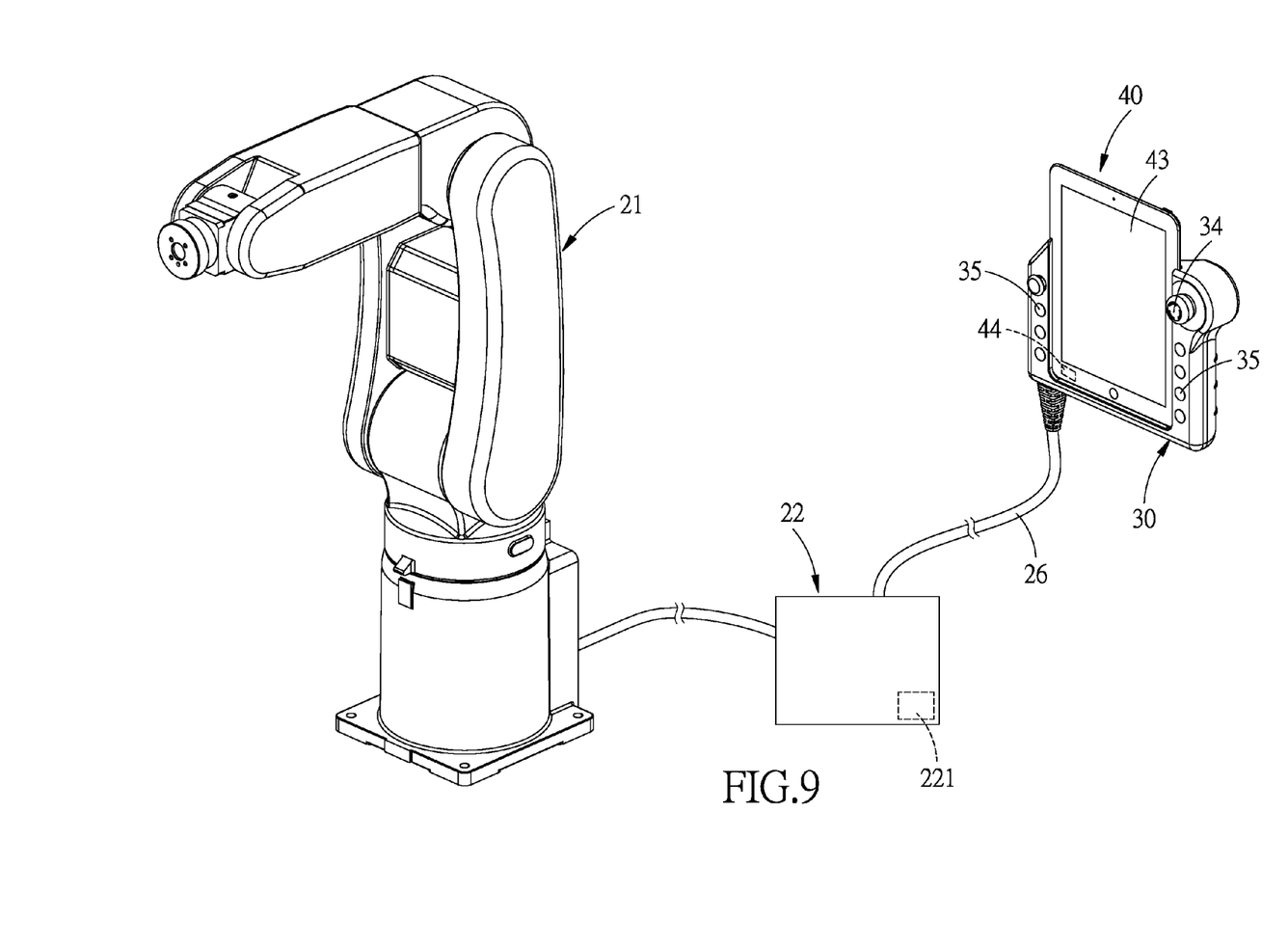
FIG. 9 is a perspective view of the robot teaching device in accordance with the second embodiment of the present invention.
Figure 10:
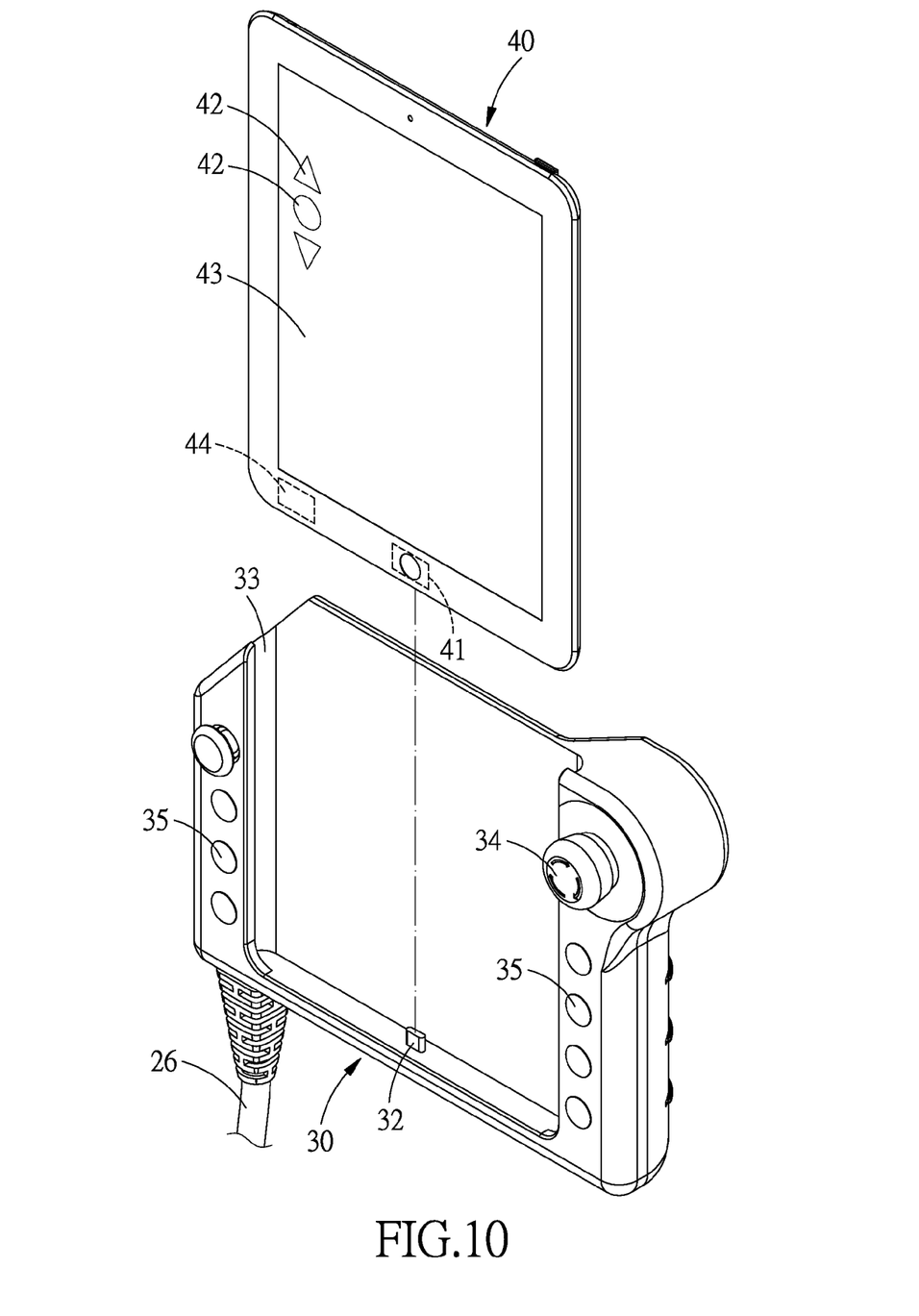
FIG. 10 is an exploded view of the robot teaching device in accordance with the second embodiment of the present invention.
Figure 11:
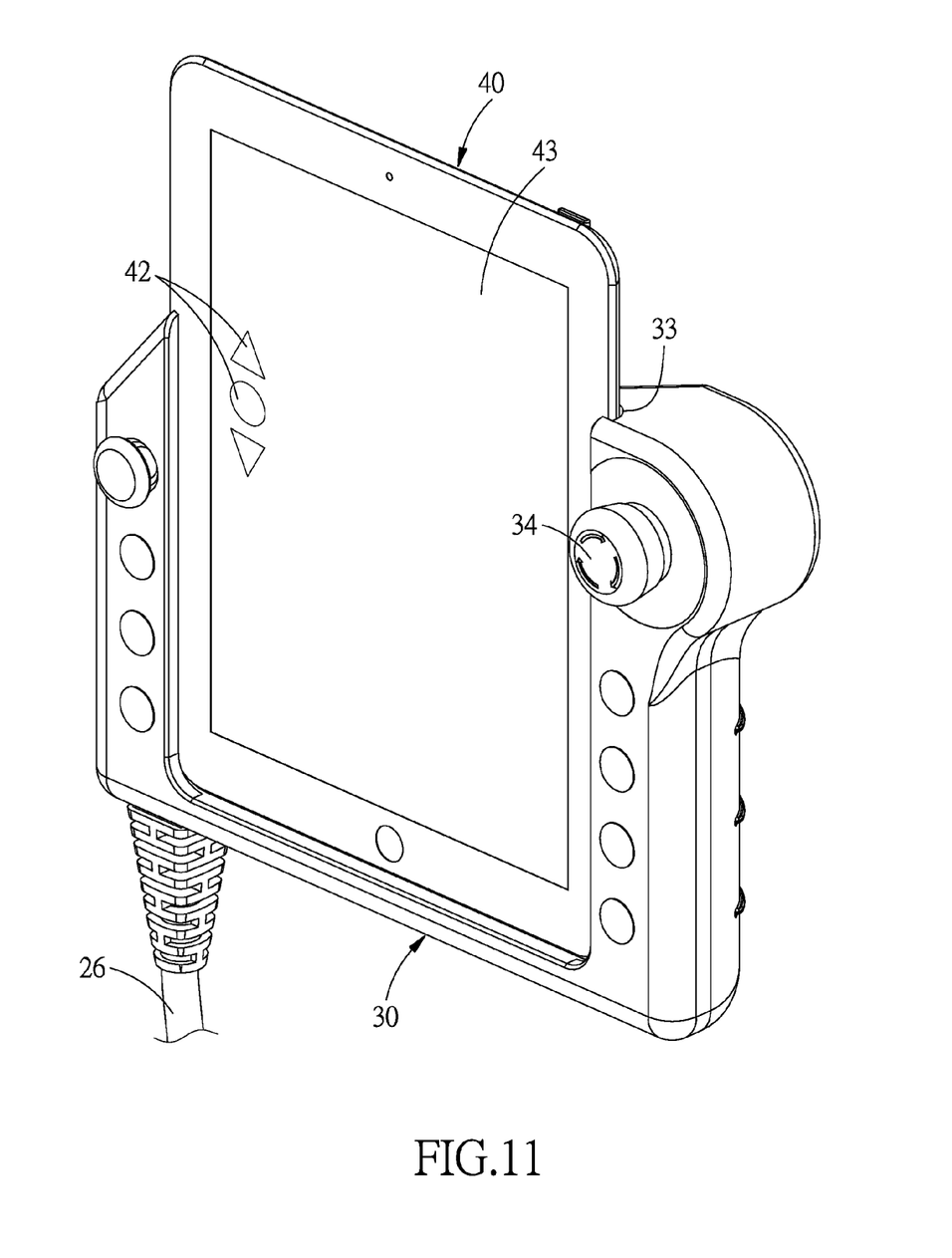
FIG. 11 is an assembly view of the robot teaching device in accordance with the second embodiment of the present invention.
Figure 12:
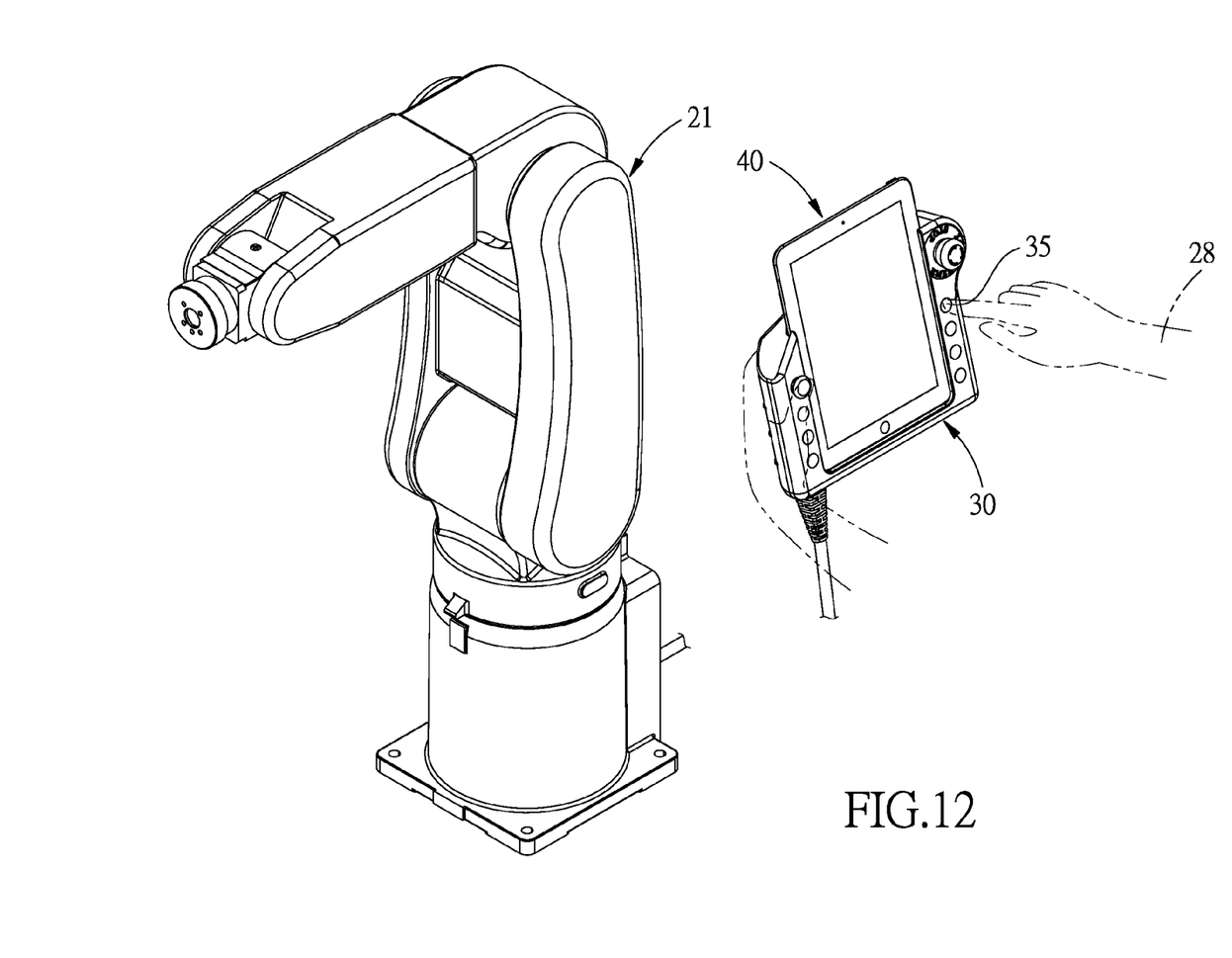
FIG. 12 is an operational view of the robot teaching device in accordance with the second embodiment of the present invention.
Figure 13:
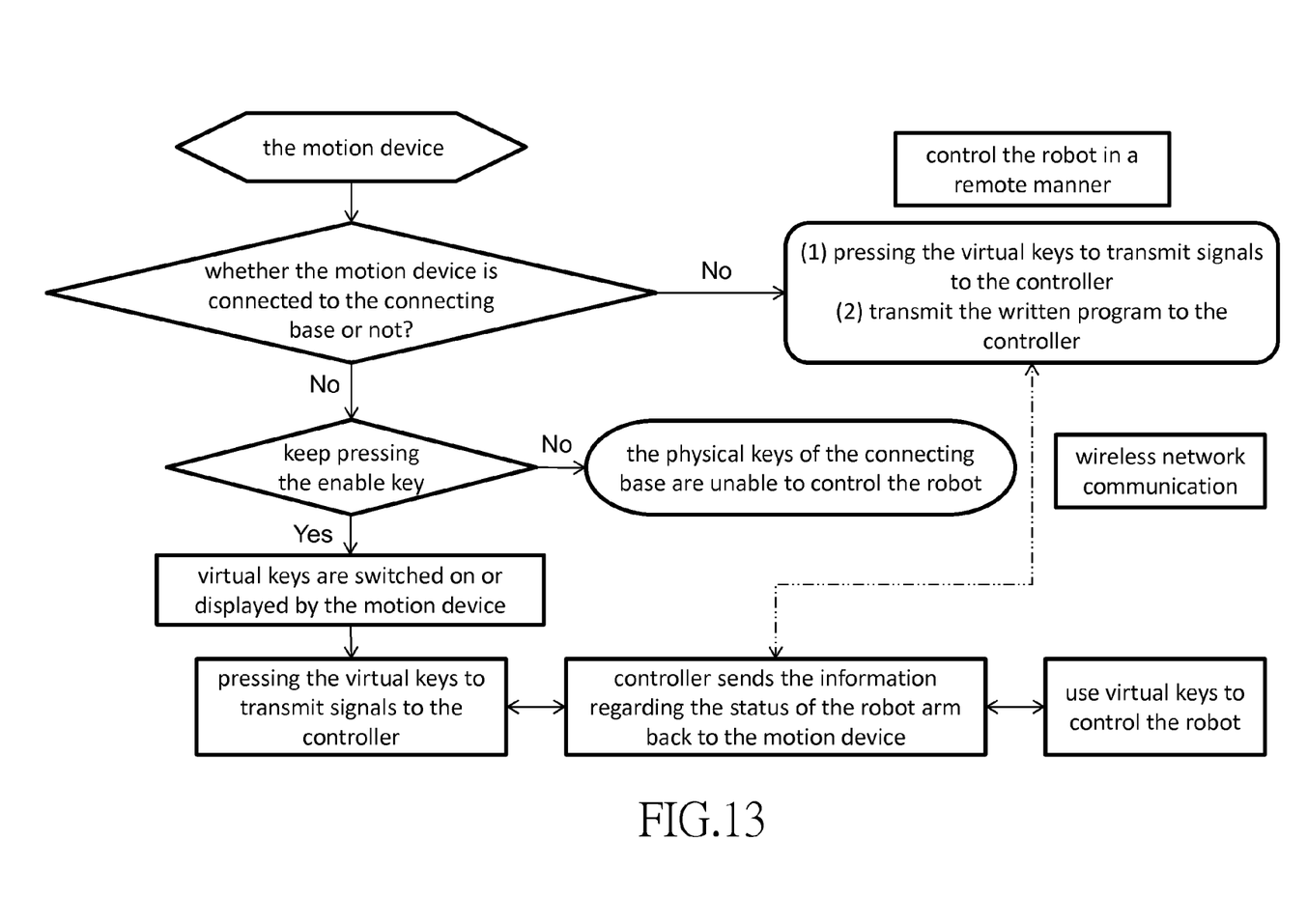
FIG. 13 is a flow chart view of a robot teaching device in accordance with a third embodiment of the present invention.
Figure 14:
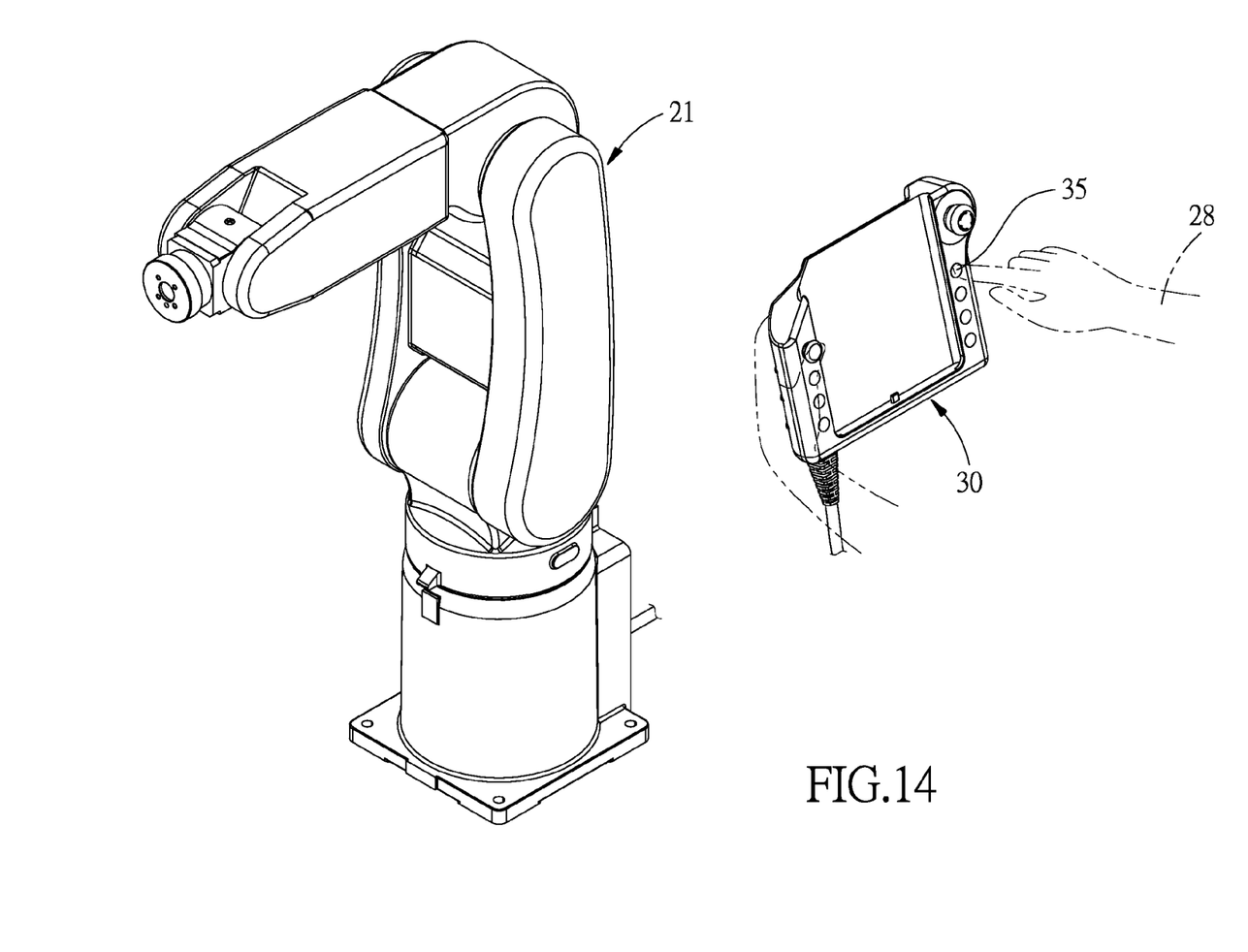
FIG. 14 is an operational view of the robot teaching device in accordance with the third embodiment of the present invention.

Referring to FIGS. 13 and 14, a robot teaching device in accordance with a third embodiment of the present invention is also suitable for being signal connected to a controller 22 which is used to control the motion of a robot 21. In this embodiment, the controller 22 includes a first wireless receiving and transmitting unit 221 (as shown in FIG. 9) capable of performing wireless signal reception and transmission. The robot teaching device essentially comprises a connecting base 30 and a motion device 40 (as shown in FIG. 10).

The connecting base 30 includes a plurality of physical keys 35, an enable switch 31 (as shown in FIG. 6) and a first connector 32 and is signal connected to the controller 22 by a transmission wire 26. In this embodiment, the connecting base 30 includes an inserting groove 33 for insertion of the motion device 40, and an emergency switch 34 (as shown in FIGS. 9 and 10) which is controlled by the controller 22 to stop the robot 21.

The motion device 40 is removably disposed in the connecting base 30, and includes a second connector 41 which is signal connected to the first connector 32, and a touch screen 43 capable of displaying a plurality of virtual keys 42. The motion device 40 will be signal connected to the controller 22 in a wireless transmission manner (such as wireless network communication), when it is removed from the connecting base 30. Meanwhile, the touch screen 43 will display the virtual keys 42, and the physical keys 35 will be deactivated. The physical keys 35 can be activated by keeping pressing the enable switch 31. When the motion device 40 is inserted in the connecting base 30, and the enable switch 31 is not pressed, the second connector 41 will be connected to the first connector 32. Meanwhile, the virtual keys 42 are switched off (deactivated), and the physical keys 35 are deactivated. The physical keys 35 will be activated by keeping pressing the enable switch 31. In this embodiment, the motion device 40 is a tablet PC or smart phone. The motion device 40 includes a second wireless receiving and transmitting unit 44 which is connected to the first wireless receiving and transmitting unit 221 in a wireless transmission manner, as shown in FIGS. 9 and 10.

The second embodiment is similar to the second embodiment, except that: the physical keys 35 can be activated by keeping pressing the enable switch 31, so that program writing, or robot teaching and controlling can be carried out, without having to inserting the motion device 40 in the connecting base 30. Therefore, the motion device 40 can be used to perform program writing in a remote manner.

While we have shown and described various embodiments in accordance with the present invention, it is clear to those skilled in the art that further embodiments may be made without departing from the scope of the present invention.

What is claimed is:

1. A robot teaching device suitable for being signal connected to a controller which is used to control motion of a robot, comprising:
   a connecting base including an enable switch and a first connector, and being signal connected to the controller by a transmission wire;
   a motion device being wirelessly connected to the controller, and including a second connector which is signal connected to the first connector, and a touch screen capable of displaying a plurality of virtual keys;
   the robot teaching device being characterized in that: the motion device is removably disposed on the connecting base, when the motion device is removed from the connecting base, the touch screen will display the virtual keys, when the motion device is inserted in the connecting base, and the enable switch is not pressed, the second connector will be connected to the first connector, and the virtual keys will be switched off, when the enable switch is kept being pressed, the second connector will be connected to the first connector, and the virtual keys will be continually switched on.

2. The robot teaching device as claimed in claim 1, wherein the controller includes a first wireless receiving and transmitting unit, and the motion device includes a second first wireless receiving and transmitting unit which is connected to the first wireless receiving and transmitting unit in a wireless transmission manner.

3. The robot teaching device as claimed in claim 1, wherein the connecting base includes an inserting groove for insertion of the motion device.

4. The robot teaching device as claimed in claim 1, wherein the connecting base includes an emergency switch, when the motion device is inserted in the connecting base, and the second connector is connected to the first connector, the emergency switch is controlled by the controller to stop the robot.

5. A robot teaching device suitable for being signal connected to a controller which is used to control motion of a robot, comprising:
   a connecting base including a plurality of physical keys, an enable switch and a first connector, and being signal connected to the controller by a transmission wire;
   a motion device being connected to the controller in a wireless manner, and including a second connector which is signal connected to the first connector, and a touch screen capable of displaying a plurality of virtual keys;
   the robot teaching device being characterized in that: the motion device is removably disposed on the connecting base, when the motion device is removed from the connecting base, the touch screen will display the virtual keys, and the physical keys will be deactivated, when the motion device is inserted in the connecting base, and the enable switch is not pressed, the second connector will be connected to the first connector, and the virtual keys will be switched off, and the physical keys will be deactivated, and when the enable switch is kept being pressed, the physical keys will be activated, the second connector will be connected to the first connector, the virtual keys will be continuously switched off.

6. The robot teaching device as claimed in claim 5, wherein the controller includes a first wireless receiving and transmitting unit, and the motion device includes a second first wireless receiving and transmitting unit which is connected to the first wireless receiving and transmitting unit in a wireless transmission manner.

7. The robot teaching device as claimed in claim 5, wherein the connecting base includes an inserting groove for insertion of the motion device, the connecting base includes an emergency switch, when the motion device is inserted in the connecting base, and the second connector is connected to the first connector, the emergency switch is controlled by the controller to stop the robot.

8. A robot teaching device suitable for being signal connected to a controller which is used to control motion of a robot, comprising:
   a connecting base including a plurality of physical keys, an enable switch and a first connector, and being signal connected to the controller by a transmission wire;
   a motion device being wirelessly connected to the controller, and including a second connector which is signal connected to the first connector, and a touch screen capable of displaying a plurality of virtual keys;
   the robot teaching device being characterized in that: the motion device is removably disposed on the connecting base, when the motion device is removed from the connecting base, meanwhile, the touch screen will display the virtual keys, and the physical keys will be deactivated, the physical keys are allowed to be activated by keeping pressing the enable switch, when the motion device is inserted in the connecting base, and the enable switch is not pressed, the second connector will be connected to the first connector, meanwhile, the virtual keys are switched off, and the physical keys are deactivated, when the enable switch is kept being pressed, the second connector will be connected to the first connector, the virtual keys will be continuously switched off, and the physical keys will be activated.

9. The robot teaching device as claimed in claim 8, wherein the controller includes a first wireless receiving and transmitting unit, and the motion device includes a second first wireless receiving and transmitting unit which is connected to the first wireless receiving and transmitting unit in a wireless transmission manner.

10. The robot teaching device as claimed in claim 8, wherein the connecting base includes an inserting groove for insertion of the motion device, the connecting base includes an emergency switch which is controlled by the controller to stop the robot.

* * * * *